125,406

UNITED STATES PATENT OFFICE.

SAMUEL R. PERCY, OF NEW YORK, N. Y.

IMPROVEMENT IN DRYING AND CONCENTRATING LIQUID SUBSTANCES BY ATOMIZING.

Specification forming part of Letters Patent No. 125,406, dated April 9, 1872.

SPECIFICATION.

*To all whom it may concern:*

Be it known that I, SAMUEL R. PERCY, of the city, county, and State of New York, have invented a new and Improved Process for the Simultaneous Atomizing and Desiccating of Fluid and Solid Substances, and its application to the purpose of the exhaustion of moisture from such substances; and I do hereby declare that the following is a full and exact description thereof, reference being had to the accompanying descriptions contained herein, and making part of this specification.

The nature of my invention consists in bringing fluid or solid substances into a state of minute division, and, while in this state of minute division, exposing the atoms to currents of air or other gases. The air may be ordinary atmospheric air, dried air, heated air, or air cooled lower than ordinary atmospheric air. The atomizing of such substances may be produced in various ways. One method may be the allowing of some solution—that of dextrine, for example—to flow from a tube, and, while in its exit, to be met by a current of air, that shall divide it into spray or atoms. The current of air may be more or less forcibly driven or directed upon the escaping fluid, and if driven with considerable force it will carry the atoms of fluid which it produces to some considerable distance, and cause the water which holds the dextrine in solution to evaporate and permit the dextrine to fall in a dry powder. This powder will be coarser or finer in proportion to the propulsive power of the air employed, to the degree of temperature and dryness of the air, and also to the degree of temperature and dryness of the chamber into which the atoms are thrown. Another instance: Starch, as it comes from the vat into which it settles, may be permitted to pass or be forced through a tube, and, at its point of exit, may be met by a current of air heated and dried and forced with considerable pressure. This rapid current of heated and dried air will force the starch into minute division, and carry it in this state of atoms many feet, into a dried and heated chamber, where the starch globule will fall deprived of the water surrounding it and permeating it, and in condition to be immediately put away. Another instance: A solution of gelatine is allowed to flow from a tube, and, at its point of exit, is met by a current of dry cold air, which is propelled with great force. The gelatine is thrown forward, in a state of minute division, into a chamber that is drier and colder than the ordinary atmosphere. The gelatine is collected almost deprived of moisture.

Any viscid substance containing water which needs to be dried may, by the method I here claim as my invention, be dried quickly and brought into a state of minute division, and may thus be protected from destructive chemical changes.

To further make my process intelligible to all, I here give a full description of the requisites necessary to accomplish the objects I have in view. Drawings cannot be made to explain my process as easily as written descriptions and explanations, because parts of the necessary means to produce the results I have accomplished consist of chambers which may be connected, and they may be at some distance apart. A chamber of any convenient size may be fitted with windows or other means of communication with the external air, such windows or other communication being covered with fine wire-cloth, bolting-cloth, muslin, or other strainer to sift the air and free it from particles of dust or dirt. The chamber may be either of the temperature of the outer air, or cooled below the ordinary temperature, or dried and heated much above the surrounding temperature, according to the substance which may be wished to be dried. From this chamber a pipe may lead to a blowing-machine, a force-pump, or other contrivance which will draw the air from the chamber just described and propel it with some force through a tube which terminates in another chamber; or a force-pump may draw the air from the chamber above described, and force it into a receiver, which is capable of sustaining great pressure. From this receiver a pipe may proceed, governed by a stop-cock, which will let more or less air, and under such degree of pressure as may be required, through this pipe, which terminates in a chamber, and is itself the terminus of the air-propelling portion of an ordinary atomizer. The pipe through which the fluid or solid substance to be atomized and desiccated passes may connect with a vessel holding the substance, and this substance will run down or be forced up through this pipe; and it may terminate like other atomizers, either in front of the air-pipe or within the air-pipe. The compressed or forced air passing through the pipe first described meets the pipe containing the substance to be desiccated, and throws the substance into a chamber in a state of minute division or atoms.

My invention is a process of atomizing and desiccating fluid and solid substances, which differs from the ordinary atomizing apparatus insomuch that the air or gas which forces the substance into atoms is dried, heated, or cooled; also that the atoms thrown forward are forced into a chamber and dried in consequence of the dried or heated air which propels them into the chamber; and also owing to the dried and heated state of the chamber into which they are thrown. Other plans than the one I have described may be adopted, but I claim the principle of atomizing and desiccating simultaneously by dried or heated air forced forward, and thus throwing substances into a state of atoms, and drying them while in this state of division.

I am well aware that atomizers are in daily use, and are too well known to need description—for sprinkling, sparging, vaporizing with fluids, for wetting—but no apparatus or principle or process has yet been used for atomizing and at the same time desiccating substances. In other words, the atomizers hitherto used have been applied to wetting substances. I claim a combination of atomizing and drying substances.

I claim—

The process of simultaneously atomizing and desiccating fluid and solid substances, and its application to the purpose of the exhaustion of moisture from such substances, and for the prevention of destructive chemical change.

SAML. R. PERCY. [L. S.]

Witnesses:
F. W. GILLEY,
GEO. R. PERCY.